S. H. Linton,

Harrow.

No. 97,416. Patented Nov. 30, 1869.

Witnesses:
Jno. T. Brooks
Alex F. Roberts

Inventor:
S. H. Linton
per Munn & Co.
Attorneys.

United States Patent Office.

SAMUEL H. LINTAN, OF BURROWS, INDIANA.

Letters Patent No. 97,416, dated November 30, 1869.

IMPROVEMENT IN HARROWS.

The Schedule referred to in these Letters Patent and making part of the same

*To all whom it may concern:*

Be it known that I, SAMUEL H. LINTAN, of Burrows, in the county of Carroll, and State of Indiana, have invented a new and improved Harrow; and I do hereby declare that the following is a full, clear, and exact description thereof, which will enable others skilled in the art to make and use the same, reference being had to the accompanying drawing, forming part of this specification.

This invention relates to improvements in harrows, and has for its object to provide an improved and simple pulverizing-attachment to the same.

The invention consists in the attachment, to a rectangular frame, the side rails of which are pivoted, and on which the harrow-teeth are placed on transverse bars near each end, of transverse pulverizing-bars, the front sides of which are inclined, so as to ride over the clods, lumps, and the like, and pulverize and crush them down, all as hereinafter specified.

Figure 1:
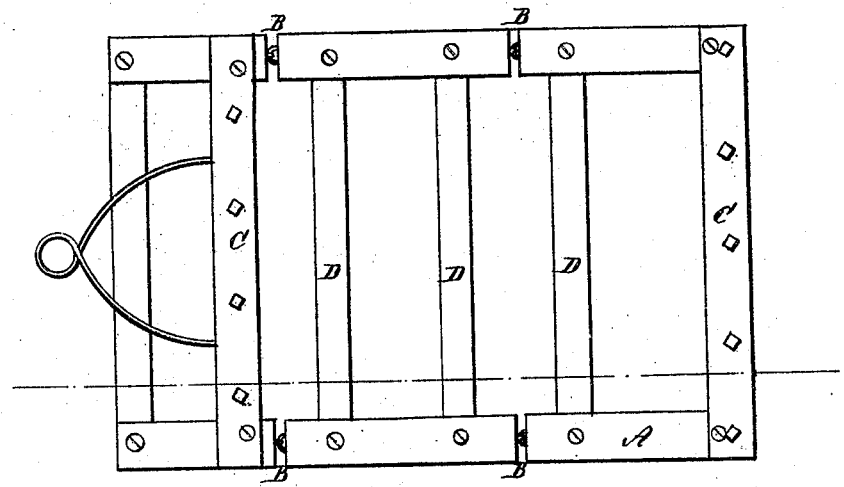
Figure 1 represents a plan view of my improved harrow.
Figure 2:
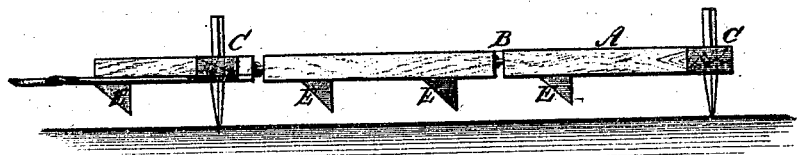
Figure 2 represents a longitudinal section of the same.

A represents a rectangular frame, the side rails of which are jointed, as shown at B.

This frame, which supports the harrow-teeth on transverse bars C, is provided with transverse pulverizing-bars D, connected to the under side of the side rails, and inclined on their lower faces, as shown at E, so that they will ride over the clods and lumps, for crushing them.

The jointed side bars permit these pulverizing-bars to work close to the surface, no matter how uneven it may be.

Having thus described my invention,

What I claim as new, and desire to secure by Letters Patent, is—

A harrow, provided with one series of perpendicular teeth in front, another series behind, and a series of clod-crushers in the middle, so that the clods may be brought to the surface by the first, crushed or mashed by the second, and pulled to pieces or pulverized by the third, all as shown and described.

SAML. H. LINTAN.

Witnesses:
GEORGE SIRES,
GEO. W. HALL.